Figure 1:
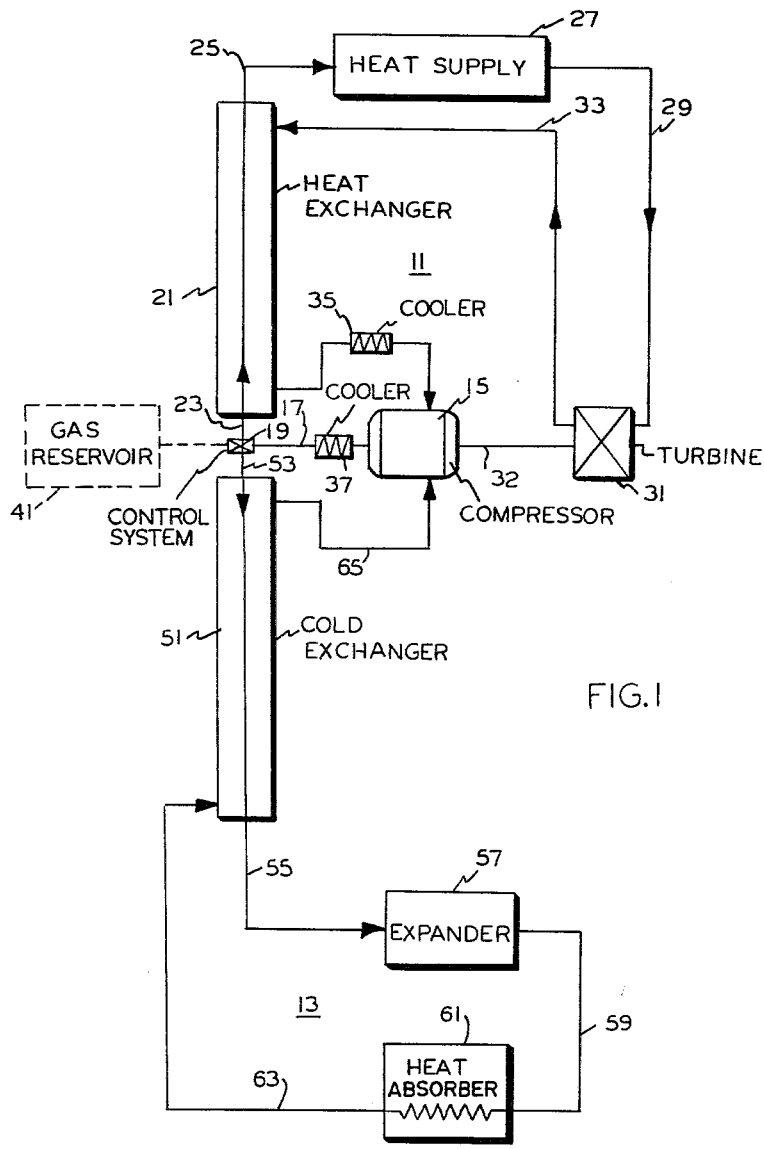

INVENTOR
GEORGE A. ZOTOS

United States Patent Office

3,214,938
Patented Nov. 2, 1965

3,214,938
THERMALLY POWERED CRYOGENIC SYSTEM
George A. Zotos, Baltimore, Md., assignor to Martin Marietta Corporation, New York, N.Y., a corporation of Maryland
Filed Jan. 2, 1963, Ser. No. 249,055
13 Claims. (Cl. 62—402)

The present invention appertains to cryogenic systems and, more particularly, to an improved apparatus and process enabling a most efficient energy utilization in deep cold units.

It should be noted at the on-set that, as herein employed, the term cryogenic systems refers to a deep cold producing system capable of providing cooling approaching temperatures in the vicinity of absolute zero and the system to be disclosed has nothing in common whatsoever with the conventional refrigeration cycle utilized in domestic type appliances wherein relatively slight refrigeration is developed by employing condensable fluids and pressure reducing valves for small temperature drops to, for example, 250° K. In extreme contrast, the subject invention enables the attainment of temperatures in the region of 80° to 3° K., or less.

In further contra-distinction to the common refrigeration process, the present invention produces extreme cold through the medium of a permanent gas, as the refrigerant substantially confined to the single gaseous phase substantially throughout the process.

The invention resolves the many problems attendant with the application of gases, particularly of the cryogenic type such as helium, neon, xenon or nitrogen, useful to the present deep cold process. This is achieved through the provision of a reversible process, yielding extremely high thermal efficiencies in a simplified, relatively inexpensive, self-contained system.

The novel cryogenic process is preferably heat-powered, utilizing a heat input source in lieu of any externally supplied electrical or mechanical energy. The concept enables self-contained compact cryostat units of even a miniature variety, exhibiting an inherent thermal efficiency heretofore unattainable. As a matter of fact, regardless of the size or capacity of the system, the torque characteristics essential in the compression utilized are attained through the matched capabilities of a turbo-compressor which may yield, in extreme cases, 200 to 300 horse power or more at 500,000 r.p.m. or higher.

Basically, the invention resides in splitting a continuous stream of a compressed gaseous cryogen into two related circuits—one a power supply loop and the other a cryogenic refrigeration loop.

The portion of gas following the cryogenic circuit encounters, preferably at least one thermal exchange component, optimally a contraflow cold exchanger and one or more expanders, with at least one expander being capable of isentropic expansion.

The other portion of gas encounters a thermal exchange component in the nature of a heat exchanger (also of the contraflow type), as well as a heat supply source and an expansion power turbine. The turbine supplies the power for compression of the gaseous stream through a compressor mechanically coupled thereto. The compressor is disposed in the gaseous refrigerant path at a point common to the circuits to continuously compress and circulate all the gas of the system. In each loop the expanded gas is circulated through the respective thermal exchange unit on its return to the compressor. Thus, the hottest and coldest parts of the system may be reversibly connected by contraflow arrangements to yield the high thermal efficiency developed by this invention.

In the practice of the invention, the input working energy may be obtained from a suitable working heat source, such as by solar radiation, particularly if the system is air-borne, or from a reactor or from heat of any origin so long as it is continually available at elevated temperatures in excess of, for example, 300° C.

It is interesting to note that, normally speaking, the higher the supplied heat, the higher the efficiency of the turbine with attendant better compression and, therefore, the system may be viewed as one of the self-priming variety in respect to the best heat utilization in the powering gas refrigerant prior to its entering the expansion power turbines. Additionally, if desired, the system may be made self-starting through the provision of a gas storage reservoir capable of a high pressure balance.

Thus it may be appreciated that both cycles or loops of the heat-powered system offer in combination unusual efficiencies, the one in the power cycle for supplying the driving power and the other in the cooling cycle, each being susceptible to the use of contraflow thermal exchange and both operable from the same continuously compressed common stream in a somewhat thermally symmetric manner. The term "thermal symmetry" is used herein to describe the presence of a balance between the heat energy supplied at the power, or hot loop and the energy removed at the refrigerating or cold loop. The two loops will be seen to unite within the common domain of the compression unit. The thermal efficiency in the combined coefficient of performance may thus exceed 20% at the lowest temperature.

With the foregoing in mind among the objects of the invention is the provision of a heat-powered refrigeration system capable of continuous cold environment production.

A further object resides in the provision of apparatus and a process capable of cryogenic refrigeration through the utilizing of a gaseous refrigerant, substantially confined to the gaseous phase.

A still further object is the provision of such a refrigeration system wherein the gaseous refrigerant may be expanded isentropically because of its nature as a permanent gas.

Another object of the invention is the provision of a closed commonly supplied double loop system exhibiting thermal symmetry to achieve in combination unusually high thermal efficiencies.

A still further object is the provision of a simplified cryogenic refrigeration system wherein a turbo-compressor may be compatibly operated to enable the compression drive for the system.

Figure 2:
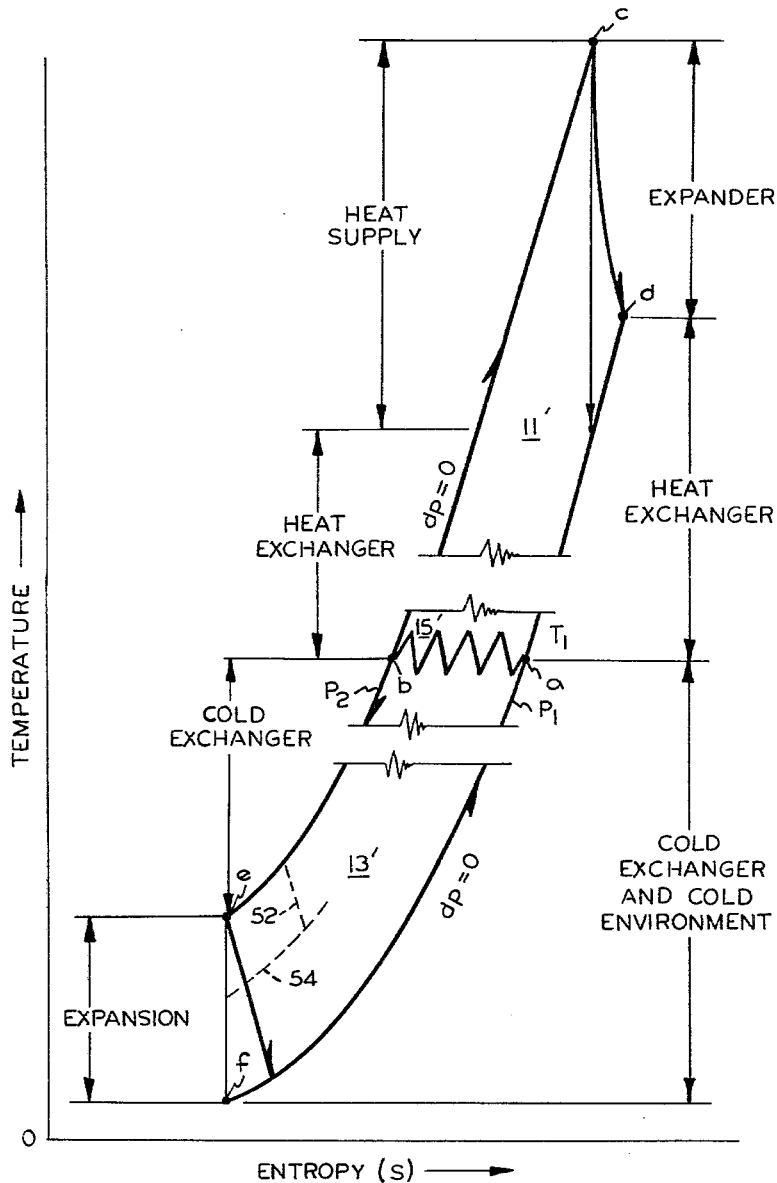

These and other objects of the invention are further described and illustrated in the detailed description to follow, which is applied to the embodiment of the drawing in which:

FIG. 1 is a diagrammatic representation of an arrangement of basic components for enabling the principles of operation of the present invention, and FIG. 2 is a graphical presentation of a temperature-entropy analysis of the cryogenic refrigeration process.

Referring to the drawings FIG. 1 is illustrative of a generalized embodiment of apparatus in accordance with the present invention, showing a heat-powered arrangement, wherein the only externally supplied energy is that of heat.

In the two loop system depicted, the upper or power loop is generally indicated at 11 and the lower or deep cooling loop is indicated at 13. The compressor 15 is located in common with the two loops 11 and 13 to compress and circulate the gaseous refrigerant. A continuous stream of a suitable refrigerant is delivered by the compressor 15 through the conduit 17, common to both loops 11 and 13 to control point or valving system 19 comprised of one or more valves. The control simply splits the continuous stream of refrigerant delivered by compressor 13 into two portions, one directed upwardly (as depicted in FIG. 1) through the power supply loop and the other downwardly (as shown in FIG. 1) through the cryogenic refrigeration loop.

First, following the power loop 11, the upwardly directed portion of the gaseous refrigerant enters a contra-flow type heat exchanger 21, via conduit 23, and emerges from the same at a higher thermal energy level. Conduit 25 delivers the partially thermally elevated refrigerant to a heat supply source 27. It is this source which may comprise any reliable external source of hot heat capable of supplying, for example, continuous heat, having a temperature in excess of 300° C. up to the limits enforced by structural design.

The now pressurized, high energy gaseous refrigerant follows conduit 29 from heat supply source 27 through the expander system section of a power turbine 31 which supplies the mechanical drive energy for the system over mechanical linkage 32. The expanded turbine exhaust gas travels along conduit 33 to the heat exchanger 21, where it transfers heat for pre-heating the compressed refrigerant being delivered to the heat exchanger. The low pressure cooled gas is then returned to common compressor 15 for recompression and recirculation—all in a continuous operation. Appropriate coolers 35 and 37 may be conveniently located around the compressor 15 for rejecting residual heat or compression heat. It may be seen that the presence of coolers is indispensable in a thermal or heat-powered cryogenic system in order to achieve deep cooling temperatures. Accordingly, the coolers as described in the system would be utilized even through conventional inter-stage cooling for isothermizing the compression function is also present in the apparatus design. The basis of such an inclusion is simply that isothermal compression is considered an optimum arrangement in conserving work of compression.

The power circuit 11 permits utilizing of a high speed turbine device driven by expanding gas which is actually compressed as a result of the turbine itself. The high efficiencies of the self-contained power circuit 11 derive from the maximum utilization of the heat as a result of temperature elevation of a permanent gas through the heat exchanger 21 and heat supply 27 and immediately following expansion from the highest possible temperature. This efficiency is further enhanced through the use of turbo-power compressors which match, most efficiently, their torques at a broad range of speeds.

Similarly, a highly efficient cryogenic refrigerating cycle 13 is included in combination as a cooperating counter part to the cryogenic powering circuit. The portion of the gaseous refrigerant delivered from conduit 17 and directed by control 19 downwardly along conduit 53 to the loop 13 first encounters a thermal exchanger, shown as a contraflow cold exchanger 51. Here the gaseous refrigerant is pre-cooled and directed along conduit 55 to one or more stages of expansion. For certain applications, it is more desirable to use multiple expansion stages but for simplicity of illustration, the invention is depicted as employing only a single expansion stage.

Thus, the pre-cooled refrigerant follows conduit 55 to the illustrated single stage expander 57, which may comprise a turbine, for example. The expander produces external work not essential to powering the invention and the decelerated low pressure refrigerant follows conduit 59 to heat absorber 61, the coldest portion of the system which establishes the extreme cold environment desired. Here the environment is utilized and the warming refrigerant is directed along conduit 63 and through cold exchanger 51 to provide the pre-cooling for the input refrigerant. Finally, the low pressure, higher temperature gas follows return path from cold exchanger 51 over conduit 65 to the compressor 15 for recompression and continuous reusage. A suitable gas storage reservoir 41, for the self-starting provision, is shown in dotted out line on FIG. 1 as operable through a valve of the valving system 19. Thermal symmetry, existing as a balance between the heat energy input at power loop 11 and energy extraction at the deep cooling or refrigerating loop 13 may be evidenced from the drawing. The balance is further evidenced inasmuch as the loops unite within the common domain of compressor 15.

The embodiment of the system as above set forth is further described while considering the idealized temperature-entropy diagram of FIG. 2 wherein the functional operation of the system is portrayed.

Initially, the cryogen gas pressure and temperature $T_1$, at start-up, is indicated at point $a$, lying on the low pressure curve $P_1$. The low pressure gas is quasi-isothermally compressed from point $a$ to point $b$, lying on pressure curve $P_2$, through common compression, as indicated at 15'. From point $b$, corresponding to the control valving 19, the compressed gaseous stream is split to follow the double loop paths as represented by the power cycle 11' and the cooling cycle 13'.

First, considering the power cycle, it may be noted that the gas preferably follows the constant pressure curve $P_2$ through the heat exchange function where its temperature is elevated by the turbine exhaust gases from turbine 31 (FIG. 1) and continues along the same curve as heat is added from the heat supply source 27 to point $c$, indicative of the highest gaseous temperature attained in the system. From point $c$ to point $d$, the gas is permitted to expand through the turbine 31, while it performs the work of supplying power for the compressor 15, coupled to the turbine 31. The exhaust gases from the turbine 31 then pass through the heat exchanger 21 to provide pre-heating, as is indicated on the $P_1$ curve between points $d$ and $a$, the idealized pressure relation being depicted with no pressure loss in the travel through the heat exchanger 21. Thus, there has been explained the idealized power cycle which is continuously operable to furnish the compressing and circulating drive for the system.

The cryogenic refrigerating cycle may be followed from the point of splitting of the compressed gas, namely point $b$ along the high pressure curve $P_2$ as the gas travels through the cold exchanger 51 to the point $e$ where one or more stages of isentropic expansion are provided by the expander 57. The solid line chart represents operation with a single stage of expansion whereas the alternate dotted cycle depicts a double expansion.

The expanded gases create the cold environment of the system, as indicated at the minimum temperature point $f$. It is from this point on that the lowest cold is extracted by the heat sink 61 for utilization purposes.

The isentropic expansion, of course, lowered the gas pressure to the $P_1$ curve which the return gases follow in providing the substantial idealized pre-cooling at cold exchanger 51 on the way back to the common compressor 15 for recompression and recirculation.

Naturally, when more than one expansion stage is employed such expansions occur between curves $P_2$ and $P_1$, generally in the region $e$ to $f$. The first expansion would take place between points $b$ and $e$, following the cold exchange function and would be represented by preferably an isentropic drop, in the form of the dotted line 52 shown parallel to line $e$–$f$, but to a pressure curve 54 disposed between curves $P_1$ and $P_2$, also shown in dotted form. Further cold exchange would then take place along the intermediate pressure curve until the next or final isentropic drop would bring the system to point $f$ with the remaining diagram being identical to that depicted in solid outline in FIG. 2. In such an arrangement, an additional heat sink would be established at a somewhat elevated temperature over the coldest temperature level and thus the system would produce a two temperature level cryogenic refrigeration.

In a typical situation, using helium in the cycle, the temperature would approach 6° K. at the lower or final expansion level and 50° K. at the heat leak interception point.

The outstanding efficiencies possible with this system are shown on the table below:

*Power input vs. output*

[Watts/watts cold]

| Output Temp. | Watts—In (Theoretical=1/a) | Watts—In (Expected) |
|---|---|---|
| 77° K. | 2.83 | 23 |
| 30° K. | 9 | 180 |
| 6° K. | 82.5 | 530 |

While the invention has been disclosed in a preferred embodiment, other and further modifications within the scope of the concept herein disclosed may occur to those skilled in the art. Accordingly, it is intended that the invention may be limited only by the scope of the appended claims.

What is claimed is:

1. Heat powered cryogenic refrigeration apparatus utilizing a gaseous refrigerant, comprising in combination a pair of closed loops in communication to provide paths for the gaseous refrigerant; means continually circulating and compressing gaseous refrigerant in said loops; cooler means intermediate said loops in the vicinity of said last mentioned means and adapted to selectively remove residual heat and heat of compression so as to establish a thermal symmetry between said pair of loops; means for supplying heat to the gaseous refrigerant in one of said loops; means responsive to the heated gaseous refrigerant for fully powering the circulating means; means in the other of said loops for cooling the refrigerant; and further means in the other of said loops for expanding and decelerating the refrigerant to effect cryogenic refrigeration in said other loop.

2. Heat powered cryogenic refrigeration apparatus utilizing a gaseous refrigerant, comprising in combination a pair of closed loops in communication to provide paths for the gaseous refrigerant; means continually circulating the gaseous refrigerant contained in said loops therethrough; coolers in the vicinity of said last mentioned means for removing residual heat and heat of compression; means for supplying heat to the gaseous refrigerant in one of said loops; turbine means responsive to the heated gaseous refrigerant for powering the circulating means; said one loop including further means for delivering the gaseous refrigerant exhausted from the turbine means to at least a portion of the heat supplying means; means in the other of said loops for pre-cooling the refrigerant; and additional means in the other of said loops for expanding and decelerating the refrigerant to effect cryogenic refrigeration.

3. Heat powered cryogenic refrigeration apparatus utilizing a gaseous refrigerant, comprising in combination a pair of closed loops in communication to provide paths for the gaseous refrigerant; means continually compressing and circulating gaseous refrigerant in said loops; coolers in the vicinity of said last mentioned means for removing residual heat and heat of compression; means for supplying heat to the gaseous refrigerant in one of said loops; means responsive to the heated gaseous refrigerant for powering the circulating means; means in the other of said loops for pre-cooling the refrigerant; further means in the other of said loops for expanding and decelerating the refrigerant to effect cryogenic refrigeration; said other loop including means for delivering the expanded refrigerant to the pre-cooling means on its return to the compressing means.

4. Cryogenic refrigeration apparatus, comprising in combination means for compressing a gas cryogen, coolers in the vicinity of said last mentioned means for removing residual heat and heat of compression; a first circuit for receiving a portion of the compressed cryogen; heat supply means including a contraflow heat exchanger connected in the first circuit for increasing the temperature of the gas therein; a power turbine connected in said first circuit and driven by the increased temperature gas therein and coupled to, in turn, drive the compressing means; a second circuit for receiving a portion of the compressed gas supplied by the common compressing means; contraflow cold exchange means connected in the second circuit for decreasing the temperature of the gas flowing therethrough; and means for expanding isentropically the gas of the second circuit to produce low cryogenic temperatures, prior to its return to the compressing means.

5. Cryogenic refrigeration apparatus, comprising in combination means for compressing a gas cryogen, a first circuit for receiving a portion of the compressed cryogen; heat supply means including a contraflow heat exchanger connected in the first circuit for increasing the temperature of the gas therein; a power turbine connected in said first circuit and driven by the increased temperature gas therein to, in turn, drive the compressing means; a second circuit for receiving a portion of the compressed gas supplied by the compressing means; contraflow cold exchange means connected in the second circuit for decreasing the temperature of the gas flowing therethrough; means for expanding isentropically, in at least one stage, the gas of the second circuit to produce low cryogenic temperatures prior to its return to the compressing means via the cold exchange means; and control means connected between the compressing means and the circuits to split the cryogen between the circuits.

6. A heat-powered cryogenic refrigeration process utilizing a single phase gaseous refrigerant comprising, compressing and circulating a continuous stream of gaseous refrigerant around hot and cold loops in communication; supplying heat in stages to the refrigerant in the hot loop; expanding the heated refrigerant to develop power for the compressing and circulating functions; circulating the expanded refrigerant to comprise one of the heat supplying stages on its return to the compressing means; removing residual heat and heat of compression from said gaseous refrigerant sufficiently to provide thermal symmetry between said hot and cold loops; pre-cooling the refrigerant in the cold loop; expanding isentropically the refrigerant in the cold loop for establishing cryogenic refrigeration in the cold loop; and circulating the expanded refrigerant to perform the pre-cooling function on its return to the compressing means.

7. A cryogenic refrigeration process utilizing a gaseous refrigerant comprising, compressing the gaseous refrigerant; circulating the gaseous refrigerant following compression along two closed paths; pre-cooling and then expanding the gaseous refrigerant following one of said paths; heating the gaseous refrigerant following the other of said paths; utilizing the heated refrigerant to cause the compression and circulation of the gaseous refrigerant along both paths; and removing residual heat and heat of compression from said gaseous refrigerant sufficiently to provide thermal symmetry between said paths.

8. A cryogenic refrigeration process utilizing a gaseous cryogen comprising, continuously compressing the gaseous cryogen; continuously splitting the cryogen into two streams respectively directed along two closed paths; pre-cooling and then expanding the cryogen following one of said paths; utilizing the expanded cryogen to perform the pre-cooling function and then returning it for recompressing; pre-heating and further heating the cryogen following the other of said paths; expanding the heated cryogen to power the continuous compressing of the cryogen; utilizing the so-expanded cryogen to perform the pre-heating function and then returning it for recompressing; and removing residual heat and heat of compression from said cryogen sufficiently to provide thermal symmetry between said paths.

9. A cryogenic refrigeration process comprising the following steps: compressing a continuous stream of gaseous cryogen; splitting the stream into two closed loop paths; increasing the temperature of the cryogen following one of the closed loop paths while decreasing the temperature of the cryogen following the other closed loop path; expanding simultaneously the cryogen of both paths and in an isentropic manner the cryogen of at least said other path to provide compression power and cryogenic temperatures respectively; said expanded cryogen as it is returned for recompressing being utilized for pre-heating the cryogen in the one path and for pre-cooling the cryogen in the other path; and removing residual heat and heat of compression from said cryogen sufficiently to provide thermal symmetry between said paths.

10. A cryogenic refrigeration process comprising the following steps: compressing a continuous stream of gaseous cryogen; splitting the stream into two circulating closed loop paths; increasing the temperature of the cryogen following one of the closed loop paths while decreasing the temperature of the cryogen following the other closed loop path; expanding simultaneously the gas of both paths and in an isentropic manner the gas of at least said other path to provide compression power and cryogenic temperatures respectively; removing residual heat and heat of compression from said cryogen sufficiently to provide thermal symmetry between said closed loop paths; directing the expanded cryogen in said one path into proximity with the cryogen entering said one path to effect preheating thereof as the expanded cryogen is returned for recompressing; and, directing the expanded cryogen in said other path into proximity with the cryogen entering said other path to effect pre-cooling thereof as the expanded cryogen is returned for recompressing.

11. A cryogenic refrigeration apparatus of a type capable of employing a single phase gaseous refrigerant, comprising in combination a pair of closed loop conduits for the gaseous refrigerant, said conduits having a common reach; means disposed along said reach for compressing the refrigerant and circulating it through said loop conduits; means in one of said loop conduits for increasing the temperature of the refrigerant circulating therethrough; power means in said one loop conduit responsive to the heated refrigerant for driving the compressor means; the means for heating the refrigerant being partially responsive to the refrigerant exhaust from said power means; means in the other of said loop conduits for partially cooling the gaseous refrigerant circulated therethrough; means for expanding the partially cooled refrigerant to produce a deep cold environment; the means for partially cooling the gaseous refrigerant utilizing the exhaust refrigerant from the expansion means for partially cooling the refrigerant circulated in said other loop conduit; and, coolers in the vicinity of the compressor for removing residual heat and the heat of compression.

12. A cryogenic refrigeration apparatus of a type employing a single phase gaseous refrigerant, comprising in combination a pair of closed loop conduits for the gaseous refrigerant, said conduits having a common reach; means disposed along said reach for compressing the refrigerant and circulating it through said loop conduits; means in one of said loop conduits for increasing the temperature of the refrigerant circulating therethrough; power means in said one loop conduit responsive to the heated refrigerant for driving the compressor means; the means for heating the refrigerant being partially responsive to the refrigerant exhaust from said power means; means in the other of said loop conduits for pre-cooling the gaseous refrigerant circulated therethrough; means for expanding the partially cooled refrigerant; the means for pre-cooling the gaseous refrigerant utilizing the exhaust refrigerant from the expansion means for partially cooling the refrigerant circulated in said other loop conduit; and pressure retaining means for initiating the powering of the compressing means.

13. A cryogenic refrigeration system for the circulation therein of a gaseous cryogen comprising:

a turbine compressor for compressing said cryogen, said compressor having an inlet and an outlet;

control means in connection with said outlet for distributing compressed cryogen into said system from said compressor outlet;

a first cooler connected intermediate said compressor and said control means;

a heat exchanger receiving a portion of compressed cryogen from said control means and having a hot gas conduit in thermal bond with said compressed cryogen, said conduit exhausting into said inlet of the compressor;

heating means receiving cryogen from said heat exchanger for increasing the temperature of said cryogen;

a turbine receiving heated cryogen from said heating means and operable in response to said heated cryogen, said turbine exhausting said heated cryogen into said hot gas conduit of said heat exchanger so as to provide thermal exchange with cryogen passing therethrough;

a second cooler in connection between the hot gas conduit of said heat exchanger and inlet of said compressor; for cooling the exhaust from said heat exchanger;

connecting means between said turbine and compressor so as to actuate said compressor in response to the operation of said turbine;

a cold exchanger receiving compressed cryogen from said control means for pre-cooling said cryogen;

an expander connected to receive pre-cooled cryogen from said cold exchanger for expanding said cryogen and for extracting work therefrom;

a heat sink connected to receive expanded cryogen exhausting from said expander; and conduit means for returning said expanded gases to said compressor inlet and providing thermal bond between said expanded cryogen and said compressed cryogen within said cold exchanger.

References Cited by the Examiner
UNITED STATES PATENTS

| | | | |
|---|---|---|---|
| 1,440,000 | 12/22 | Bonine | 62—402 |
| 1,871,244 | 8/32 | Steuart | 62—402 |
| 2,409,159 | 10/46 | Singleton | 62—402 |
| 2,411,347 | 11/46 | Trumpler | 62—191 |
| 2,511,716 | 6/50 | Katzow | 62—87 |

WILLIAM J. WYE, *Primary Examiner.*